US010053042B2

(12) United States Patent
Garcia Eireos (10) Patent No.: US 10,053,042 B2
(45) Date of Patent: Aug. 21, 2018

(54) METHOD OF WRAPPING AN INFLATABLE AIRBAG FOR PROTECTION OF A PERSON, WRAPPED INFLATABLE AIRBAG, WRAPPING FOR INFLATABLE AIRBAG, AIRBAG MODULE AND VEHICLE SAFETY SYSTEM

(71) Applicant: Dalphi Metal Espana S.A., Madrid (ES)

(72) Inventor: Fernando Garcia Eireos, Vigo (ES)

(73) Assignee: DALPHI METAL ESPANA S.A. (ES)

( * ) Notice: Subject to any disclaimer, the term of this patent is extended or adjusted under 35 U.S.C. 154(b) by 188 days.

(21) Appl. No.: 15/008,541

(22) Filed: Jan. 28, 2016

(65) Prior Publication Data
US 2016/0221529 A1 Aug. 4, 2016

(30) Foreign Application Priority Data
Feb. 3, 2015 (DE) .................. 10 2015 001 234

(51) Int. Cl.
*B60R 21/201* (2011.01)
*B29C 65/08* (2006.01)
(Continued)

(52) U.S. Cl.
CPC .......... *B60R 21/201* (2013.01); *B29C 65/02* (2013.01); *B29C 65/08* (2013.01); *B29C 65/48* (2013.01);
(Continued)

(58) Field of Classification Search
CPC ....... B60R 21/201; B60R 21/16; B60R 21/20; B60R 21/237; B60R 2021/23533;
(Continued)

(56) References Cited

U.S. PATENT DOCUMENTS 6,186,534 B1 2/2001 Heinz
2002/0020995 A1* 2/2002 Abe .................. B60R 21/20
280/743.1

(Continued)

FOREIGN PATENT DOCUMENTS

DE 102012014599 A1 * 1/2014 ......... B60R 21/2176
EP 3034360 * 6/2016 ........... B60R 21/201

OTHER PUBLICATIONS

Padin et al. EP 3034360 A2, Machine English Translation, ip.com Jun. 2016 (Year: 2016).*

*Primary Examiner* — Karen Beck
(74) *Attorney, Agent, or Firm* — Tarolli, Sundheim, Covell & Tummino LLP (57) ABSTRACT

The invention relates a method of wrapping an inflatable airbag (31) for the protection of a person, comprising the steps of:
folding an airbag (31),
fastening the folded airbag (31) to a module carrier,
positioning the folded airbag (31) fastened to the module carrier relative to a wrapping (20) including plural surface portions (21) such that the respective outer ends (23) of the surface portions (21) project from the airbag (31),
folding each of the outer ends (23) of the surface portions (21) toward the middle (M) of the wrapping (20) so that the folded airbag (31) is wrapped at least in portions, and
connecting, especially welding, the outer ends (23) of the surface portions (21) in portions to the airbag (31).

19 Claims, 3 Drawing Sheets

(51) Int. Cl.
    *B60R 21/235*    (2006.01)
    *B29C 65/48*     (2006.01)
    *B29C 65/62*     (2006.01)
    *B29L 22/02*     (2006.01)
    *B29C 65/00*     (2006.01)
    *B29C 65/02*     (2006.01)

(52) U.S. Cl.
    CPC ........... *B29C 65/62* (2013.01); *B29C 66/1122* (2013.01); *B29C 66/21* (2013.01); *B29C 66/431* (2013.01); *B29C 66/71* (2013.01); *B29L 2022/027* (2013.01); *B60R 2021/23533* (2013.01)

(58) Field of Classification Search
    CPC ....... B29C 66/112; B29C 65/48; B29C 65/62; B29C 65/02; B29C 66/21; B29C 66/431; B29C 66/71; B29C 65/08; B29L 2022/027
    See application file for complete search history.

(56) References Cited

U.S. PATENT DOCUMENTS

2008/0277907 A1    11/2008  Sata et al.
2013/0200664 A1*    8/2013  Patterson ............ B60R 21/2176
                                               297/216.1

* cited by examiner

FIG. 1 State of the Art

METHOD OF WRAPPING AN INFLATABLE AIRBAG FOR PROTECTION OF A PERSON, WRAPPED INFLATABLE AIRBAG, WRAPPING FOR INFLATABLE AIRBAG, AIRBAG MODULE AND VEHICLE SAFETY SYSTEM

RELATED APPLICATIONS

This application claims priority from German Application No. 10 2015 001 234.7, flied Feb. 3, 2015, the subject matter of which is incorporated herein by reference in its entirety,

BACKGROUND OF THE INVENTION

The invention relates a method of wrapping an inflatable airbag for the protection of a person. Apart from that, the invention relates to a wrapped inflatable airbag for the protection of a person. Moreover, the invention relates to a wrapping for an inflatable airbag for the protection of a person, an airbag module and a vehicle safety system.

Figure 1:
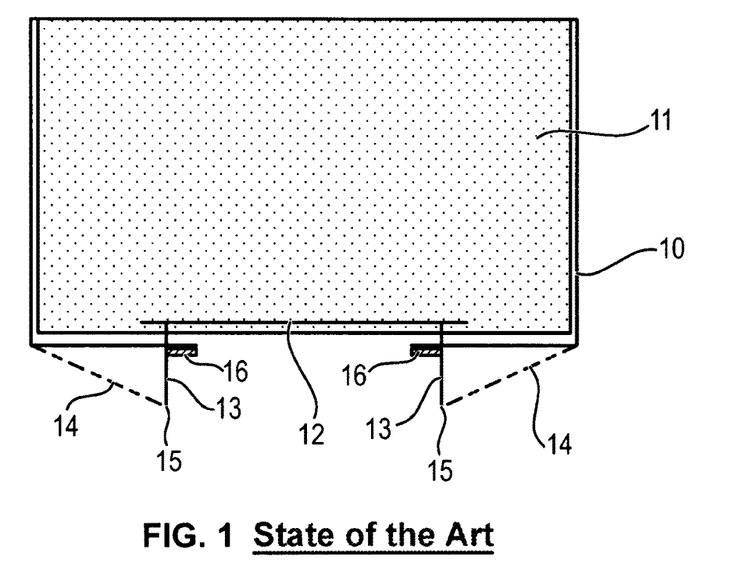
FIG. 1 shows a wrapped inflatable airbag according to the state of the art.

It is known from prior art that folded driver airbags are mounted in a vehicle steering wheel. In a mounting variant the folded airbag must remain spaced apart from a module cap in the mounted state so as to allow the module cap to be pressed down. Pressing down the module cap is necessary, for example, for triggering a horn. It is known in this context, as is shown in FIG. 1, for example, to surround the folded airbag 11 with a strip 10 e.g. of airbag material and to fasten the same to a module carrier 12. The fastening to the module carrier 12 is effectuated, for example, by pulling or putting the strip 10 with two holes over the bolts 13 of the module carrier 12. The strip 10 is configured regarding its length such that the holes can be put ever the ends 15 of the bolts 13. At both ends of the strip 10 an additional wrapping surface 16 is required so that the strip 10 can be pulled over the bolts 13.

Once the boles are threaded over the bolts 13, the tension acting on the strip 10 decreases so that the volume of the folded airbag 11 is increased. In the finally mounted state the airbag consequently has an unnecessarily large volume. Moreover the shown method for wrapping an inflatable airbag is relatively complex as to its implementation.

SUMMARY OF THE INVENTION

The object of the present invention is to provide a method of wrapping an inflatable airbag for the protection of a person by which the airbag has a small volume even in the mounted state. Moreover, a method which can be implemented more quickly is to be stated. It is further an object to state an advanced wrapped airbag which is characterized by a small folding and packing volume.

Furthermore, it is the object to state a wrapping for an inflatable airbag so that a method for wrapping an inflatable airbag for the protection of a person can be implemented more quickly.

Moreover, it is the object of the invention to state an airbag module and a vehicle safety system comprising an advanced wrapped inflatable airbag and/or an advanced wrapping for an inflatable airbag.

In accordance with the invention, this object is achieved as regards the method of wrapping an inflatable airbag for the protection of a person by the subject matter of the claims, as regards the wrapped inflatable airbag for the protection of a person by the subject matter of the claims, as regards the wrapping for an inflatable airbag by the subject matter of the claims, as regards the airbag module by the subject matter of the claims and as regards the vehicle safety system by the subject matter of the claims.

Advantageous and expedient configurations of the method of wrapping an inflatable airbag for the protection of a parson according to the invention and, resp., of the inflatable airbag wrapped according to the invention and, resp., the wrapping for an inflatable airbag according to the invention are described.

The method of wrapping an inflatable airbag for the protection of a person according to the invention especially relates to a driver airbag arranged to be integrated in a steering wheel. The method for wrapping an inflatable airbag for the protection of a person according to the invention comprises the steps of:
  folding an airbag,
  fastening the folded airbag to a module carrier,
  positioning the folded airbag fastened to the module carrier in relation to a wrapping including plural surface portions such that the respective outer ends of the surface portions project from the airbag,
  folding each of the outer ends of the surface portions toward the middle of the wrapping so that the folded airbag is wrapped at least in portions, and
  connecting, especially welding, in portions the outer ends of the surface portions to the airbag.

Accordingly, the invention is based on the idea to connect, especially to weld, a wrapping to the airbag so that the length of the wrapping or of individual surface portions of the wrapping can be selected independently of the bolt length of a module carrier.

In the simplest case, the wrapping is an elongate strip including two surface portions, i.e. starting from the middle of the strip, left and right surface portions having left and right ends, the two ends or the two outer ends of the surface portions being connected, especially welded, to the airbag. Alternatively it is possible to adhesively bond and/or stitch the outer ends of the surface portions to the airbag.

In an independent aspect, the method of wrapping an inflatable airbag for the protection of a person according to the invention is based on the steps of:
  folding an airbag,
  fastening the folded airbag to a module carrier which preferably comprises at least two bolts,
  positioning the folded airbag fastened to the module carrier relative to a wrapping having plural surface portions such that the respective outer ends of the surface portions project from the airbag,
  folding each of the outer ends of the surface portions toward the middle of the wrapping so that the folded airbag is wrapped at least in portions and at least two surface portions are arranged to be overlapping at least in portions in an overlapping area, and
  connecting, especially welding, in portions at least two surface portions to each other in the overlapping area.

In the independent aspect the invention is based on the idea to position a wrapping relative to a folded airbag fastened to a module carrier so that at least two surface portions or at least the respective outer ends of the surface portions project from the airbag. Subsequently, each of the outer ends of the surface portions is folded in the direction of the middle of the wrapping in such manner that the folded airbag is wrapped at least in portions. The lengths of the surface portions are selected so that at least two surface portions, especially two respective outer ends of the surface portions, can be arranged to be overlapping at least in portions in an overlapping area. This is followed by connecting, especially welding, at least two surface portions to each other in portions in the overlapping area. As an alternative to welding, at least two surface portions can be connected to each other in the overlapping area by stitching and/or adhesive bonding.

During welding of at least two surface portions to each other in the overlapping area at least two surface portions may be provided to be welded with the airbag in the overlapping area. Hence it is imaginable that during a welding operation the two surface portions are welded not only to each other in the overlapping area but in addition to the airbag. Moreover, it is possible that the wrapping is welded either in the overlapping area or outside the overlapping area in addition to the airbag. Connecting, which is referred to as connecting, especially welding, in portions, provides that the surface portions need not be connected or welded in the complete overlapping area. The connection or welding has to be effectuated only to the extent that in the non-activated state a wrapped airbag is fastened to be sufficiently tightly packed to the module carrier due to the connected wrapping.

At least one surface portion of the wrapping can have at least one preferably curved and/or circle segment-shaped extension at the outer end. An extension configured in this way can be part of the overlapping area formed by at least two surface portions, for example.

In another embodiment of the invention, at least one surface portion includes two preferably curved and/or circle segment-shaped extensions at the outer end. An outer end of a surface portion can comprise, for instance, an outer surface edge which has a straight or curved shape. In the corner areas of the surface edge which are formed by the longitudinal extensions of a surface portion the extensions can be formed, for example. The extensions can be formed tab-like as circle segments and/or curved shapes. This is no final listing of possible geometrical shapes of extensions. Preferably, the extensions are to be designed so that as large overlapping areas as possible can be formed with surface portions which have to be arranged to be overlapping.

At least one extension of a surface portion can project from the width of the dedicated surface portion in the non-connected, especially non-welded state. The width of a surface portion is formed, for example, by the outermost edge of a surface portion which is formed to be maximally spaced apart from a middle of the surface portion. At least one extension projects from this width or, resp., at least one extension is formed at the surface portion so that the width of the surface portion is increased in the area of the extension. It is also possible to design a surface portion with a dedicated extension or dedicated extensions, resp., which both project from the width of the dedicated surface portion. It is equally imaginable that a surface portion including two extensions is configured symmetrically to an axis of symmetry extending transversely to the width of the surface portion. This facilitates manufacture and reduces the manufacturing costs of a surface portion.

A respective overlapping area of two surface portions arranged to be overlapping is preferably formed by two extensions of two surface portions, especially of two juxtaposed and, resp., folded surface portions of the wrapping.

In another embodiment of the invention at least one surface portion of the wrapping includes a recess, especially a cut, at the outer end, wherein the folded airbag fastened to a module carrier is positioned relative to the enclosure so that at least one bolt of the module carrier is positioned in a recess. In other words, a recess at the outer end of a surface portion can serve as positioning aid when positioning the wrapping relative to the airbag as well as when folding each of the outer ends of the surface portions in the direction of the middle of the wrapping. The wrapping and, resp., the surface portions preferably have to be positioned and folded in the method according to the invention so that each of the bolts of a module carrier is positioned in a recess. By recess for example a cut or an indentation at the outer end of a surface portion is meant. The positioning in the recess can be configured, on the one hand, so that the bolt contacts at least in portions material of the surface portion, especially of the outer end. Also a spaced positioning of the bolts in the recess or in the indentation of the material is possible without contacting the same. If the bolts are used as positioning aid in the method according to the invention for wrapping an inflatable airbag, also an originally incorrect or inaccurate positioning of the folded airbag fastened to the module carrier relative to the wrapping can be corrected, especially shifted, before at least two surface portions are connected to each other in the overlapping area.

Welding can be carried out by means of ultrasonic welding and/or hot welding. On the one hand, this relates to connecting the outer ends of the surface portions to the airbag and, on the other hand, to connecting at least two surface portions to each other in the overlapping area. Connecting and welding, resp., of at least two surface portions in the overlapping area with the airbag also can be performed by said welding methods. During welding first a welded spot can lead to connecting the outer ends of the surface portions to the airbag and/or to connecting at least two surface portions to each other in the overlapping area. Moreover, plural welded spots can be provided. Also welding by means of a weld line or plural weld lines is possible, it may be provided in the method according to the invention that the individual welds are successively carried out. Also simultaneous welding of all overlapping areas and/or the outer ends of the surface portions to the airbag is imaginable. For this purpose, an automated welding method is preferred.

Since the wrapping and the dimensions of the wrapping are no longer to be configured depending on the dimensioning of the bolts of the module carrier, first of ail wrapping material can be saved. Moreover, the method according to the invention offers the advantage that the complicated threading or putting a strip around the bolt is dropped. Since the fastening of the wrapping is carried out either directly on the folded airbag and/or on the wrapping itself, no state of relief is brought about, as this is the case during previous threading onto bolts of a module carrier. The volume of the folded airbag thus is not unnecessarily increased. Hence a maximum possible tight and volume-reduced wrapping of the folded airbag is obtained by the method according to the invention.

Within the scope of another aspect, the invention is based on the idea to state a wrapped inflatable airbag manufactured especially according to an afore-mentioned method according to the invention. Advantages similar to those explained already in connection with the afore-described method according to the invention are resulting.

As regards a wrapped inflatable airbag for the protection of a person, the object is further achieved by the features of the claims. Accordingly, the folded airbag is fastened to a module carrier and is wrapped at least in portions by a wrapping having at least two surface portions. In accordance with the invention, at least the outer ends of the surface portions are connected, especially welded, to the airbag.

In a structurally simple configuration of the invention, the invention is in the form of a strip. Starting from the middle of the strip two surface portions are formed on the left and on the right of a strip center. The outer ends of the surface portions can be wrapped around the airbag such that the latter is wrapped at least in portions. The outer ends of such strip can be connected, especially welded, to the airbag.

According to a further independent aspect, the invention relates to a wrapped inflatable airbag for the protection of a person, wherein the folded airbag is fastened to a module carrier and is wrapped at least in portions by a wrapping having at least two surface portions. As regards a wrapped inflatable airbag for the protection of a person, the object is further achieved by the features of the claims.

In accordance with the invention, at least the outer ends of the surface portions are folded toward the middle of the wrapping so that the surface portions are arranged to be overlapping at least in portions in an overlapping area, the surface portions being connected, especially welded, to each other in the overlapping area. Advantages similar to those explained already in connection with the afore-described method according to the invention are resulting. The inflatable airbag wrapped according to the invention is characterized by a compact wrapping as well as by an as small packing volume as possible. Furthermore, it is no longer necessary, as surface portions need no longer be put over bolts, to provide a wrapping surface larger than the required packing volume.

In an embodiment of the invention, at least two surface portions of the wrapping can be connected, especially welded, to the airbag in the overlapping area. As an alternative to this, the surface portions may be stitched and/or glued to the airbag in the overlapping area.

At feast one surface portion can have a recess, especially a cut, at the outer end, wherein the folded airbag fastened to the module carrier is positioned relative to the wrapping so that at least one bolt of the module carrier is positioned in a recess. The recess or cut of the surface portion can also be referred to as indentation of the outer edge of the surface portion. Preferably said recess is formed between two extensions of the surface portion. Consequently, at least one bolt can be positioned in this recess, this being possible with or without contacting the surface portion.

As regards a wrapping for an inflatable airbag for the protection of a person, especially for an inflatable airbag wrapped according to the invention, the object is further achieved by the features of the claims. Accordingly, the wrapping of the invention includes at least four surface portions being cross-shaped, wherein at least one outer end of a surface portion includes a preferably curved and/or circle segment-shaped extension projecting from the width of the dedicated surface portion. In other words, the wrapping is cross-shaped, with each of the four cross elements constituting a surface portion. In other words, the wrapping is formed of two strips arranged in cross shape.

The outer ends of the surface portions are the end portions of the respective surface portions spaced apart from the center of the cross. The longitudinal axis of the surface portion is formed by a line from the middle of the wrapping to the middle of the outermost edge of a surface portion. The width of a surface portion is preferably formed by a vertical with respect to the longitudinal axis of the surface portion, the vertical being formed in a central area of the longitudinal axis. In other words, the vertical formed with respect to the longitudinal axis is spaced both from the middle of the wrapping and from the outer edge of the surface portion. The outermost edge can be curved or straight for example. According to the invention, at least one outer end of a surface portion includes an extension. Such extension can also be referred to as additional surface tab. The extension projects from the width of the dedicated surface portion and broadens the surface portion at the outer end.

Moreover, at least one surface portion can have two preferably curved and/or circle segment-shaped extensions at the outer end. In this case, both extensions project from the width of the dedicated surface portion.

The symmetric configuration of a surface portion regarding the extensions formed is advantageous as this facilitates the manufacturing process in terms of a wrapping. This is accompanied by cost reduction. The axis of symmetry extends preferably perpendicularly to the width of a surface portion and bisects the surface portion widthwise. In an especially preferred embodiment of the invention, all four surface portions are configured equally, i.e. all four surface portions have the same arrangement of extensions. Of preference, also the shape of the extensions is configured equally on ail four surface portions. Hence it is imaginable that a wrapping according to the invention is formed in an axially symmetric manner regarding both a longitudinal axis and a transverse axis.

Further, at least one surface portion can have a recess, especially a cut, at the outer end. The cut can also be referred to as indentation of the material of the surface portion. Such recess serves for positioning the wrapping around a bolt. Preferably the recess is formed between two extensions of a surface portion.

The wrapping can be made of polyethylene terephthalate (PET) or polyamide (PA) or polyethylene, such as high-density polyethylene (PE-HD or HDPE). Uncoated PET turns out to be especially suited. The selection of the material for a wrapping has to be focused on its capability of being welded.

Within the scope of an independent aspect, the invention is based on the idea to state an airbag module comprising an afore-described wrapped airbag and/or comprising an afore-described wrapping. The airbag module according to the invention further comprises an inflator for inflating the airbag. Advantages similar to those explained already in connection with the described method according to the invention and, resp., with the inflatable airbag wrapped according to the invention or with the wrapping according to the invention are resulting.

As regards a vehicle occupant restraint system, the object is achieved by the features of the claims. Hence a vehicle occupant restraint system, especially a driver airbag, comprises an airbag wrapped according to the invention and/or a wrapping according to the invention and/or an airbag module according to the invention. Advantages similar to those explained already in connection with the described method for wrapping an inflatable airbag according to the invention and/or with an airbag wrapped according to the invention and/or with a wrapping according to the invention and/or with an airbag module according to the invention are resulting.

BRIEF DESCRIPTION OF THE DRAWINGS

Hereinafter the invention shall be illustrated in detail by way of embodiments with reference to the enclosed schematic drawings. Further features and advantages of the invention are resulting from the following description in conjunction with these drawings in which.

DESCRIPTION

Hereinafter equal reference numerals are used for equal and equally acting parts.

The method regarding a wrapped inflatable airbag to be manufactured according to the state of the art, as illustrated in FIG. 1, has been explained already in the beginning.

Figure 2:
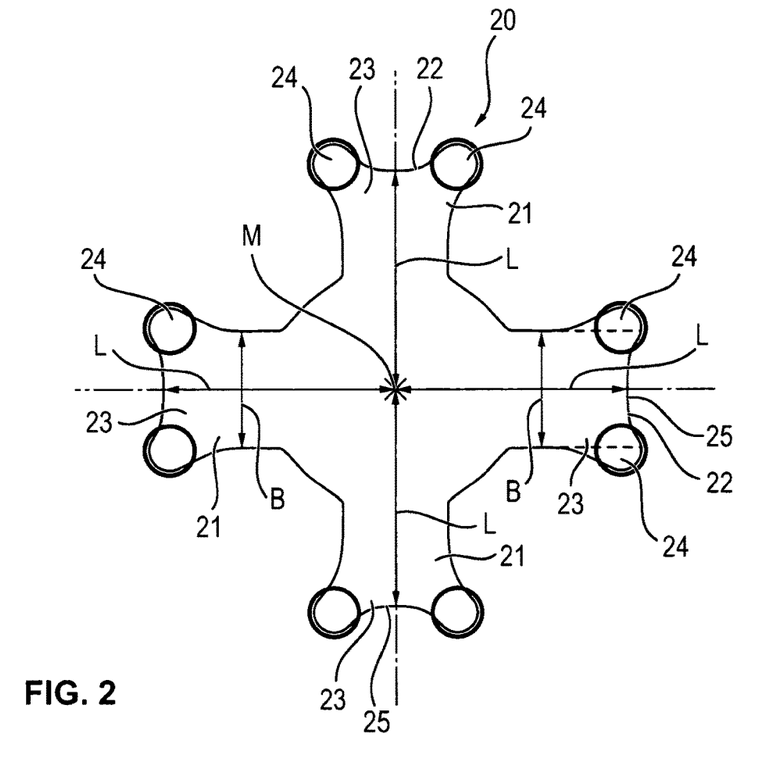
FIG. 2 shows a wrapping according to the invention.

FIG. 2 shows a wrapping 20 according to the invention for an inflatable airbag. The wrapping comprises four surface portions 21 constituting a cross shape. The individual surface portions 21 are substantially normal to each other. The lengths L of the surface portions 21 extend from the middle M of the wrapping to the respective outer edge 22 of the surface portion 21. The outer edges 22 are maximally spaced from the middle M of the wrapping 20.

Two respective opposing surface portions 21, such as the upper and lower surface portions 21, are arranged in an axially symmetric manner with respect to the longitudinal axis L extending through the left and right surface portions 21. The left and right surface portions 21, too, are opposed to each other, these two surface portions 21 being arranged in an axially symmetric manner with respect to the longitudinal axes extending through the upper and lower surface portions.

According to FIG. 2, each of the outer ends 23 of the surface portions 21 includes two extensions 24. The extensions 24 have a curved shape. The extensions 24 project from the width B of the pertinent surface portions 21. The width B is a vertical with respect to the length L of a surface portion 21. Said vertical is spaced both from the outermost edge 22 and from the middle M of the wrapping 20. The extensions 24 thus broaden the surface portions 21 in the area of the outer end 23. The broadening is represented by the two broken lines in the right surface portion 21.

The outer edges 22 of the wrapping 20 are equally curved in the shown example. This curved shape of the outer edge 22 results in the fact that a recess 25 is formed at the outer end 23. This recess 25 could also be in the form of a cut. The recess 25 is configured between the two extensions 24. In the present case the wrapping 20 is made of uncoated PET material.

Figure 3:
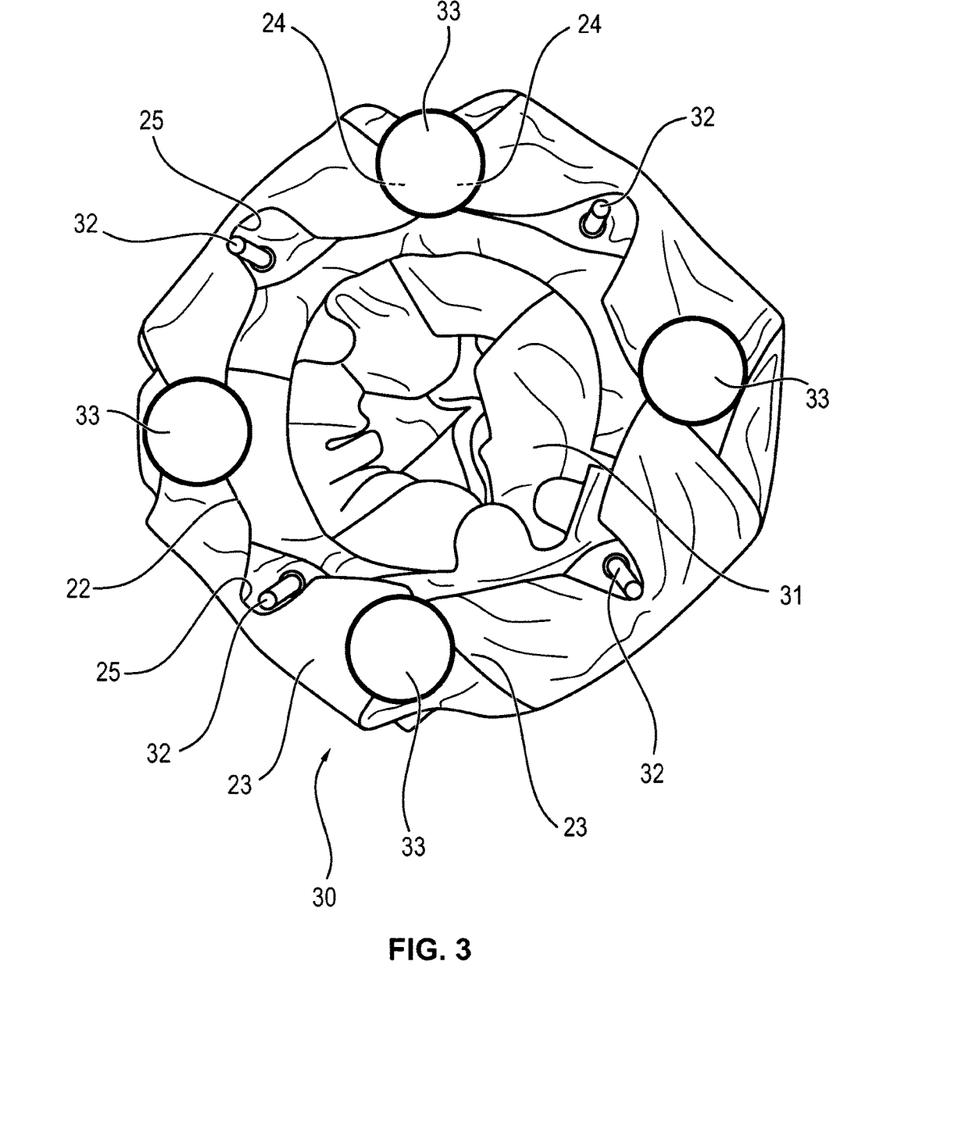
FIG. 3 shows a folded airbag wrapped according to the invention.

FIG. 3 illustrates an inflatable airbag 30 for the protection of a person wrapped according to the invention. The folded airbag 31 is fastened to a module carrier (not visible). Merely the four bolts 32 of the module carrier are evident. The wrapped inflatable airbag 30 is wrapped by the wrapping 20 at least in portions. In a method step (not shown) the outer ends 23 of the surface portions 21 are positioned to be projecting from the airbag 30. The outer ends 23 of the surface portions 21 are subsequently folded toward the middle M of the wrapping, the folded airbag fastened to the module carrier having been positioned relative to the wrapping 20 before.

Two respective juxtaposed surface portions 21 are arranged to be overlapping at least in portions. The area of the overlapping arrangement of two surface portions 21 is referred to as overlapping area 33. The two surface portions 21 are connected, viz. welded, to each other in portions in the overlapping area 33. Furthermore, the two juxtaposed and overlapping surface portions can be provided to be welded with the airbag 30 in the overlapping area 33. The overlapping areas 33 are formed by two respective extensions 24 of adjacent surface portions 21 of the wrapping 20.

The recesses 26 formed at the outer end 23 are equally visible in FIG. 3. The folded airbag 30 fastened to a module carrier is positioned relative to the wrapping 20 such that the bolts 32 are positioned in the recesses 25. Hence the recesses 25 serve as positioning aid of the wrapping 20 relative to the folded airbag 31 fastened to the module carrier.

It is obvious that the geometry of the wrapping, especially the length L of the individual surface portions 21 can be dimensioned independently of the length of the bolts 32. Putting the outer ends 23 of the surface portions 21 over the bolts 32 is not required according to the method of the invention. The tension of the wrapping 20 is constant during the entire wrapping procedure so that no expansion of the wrapped airbag 31 can occur.

Since the overlapping areas 33 and thus the areas of the surface portions 21 to be welded with each other and, resp., of the surface portions 21 with the airbag 31 are evenly spread, the tension on the wrapping resulting from the connection of the surface portions is evenly spread. Connecting or welding the surface portions 21 in the overlapping area 33 can be materialized by one single or by plural welded spots.

Figure 4:
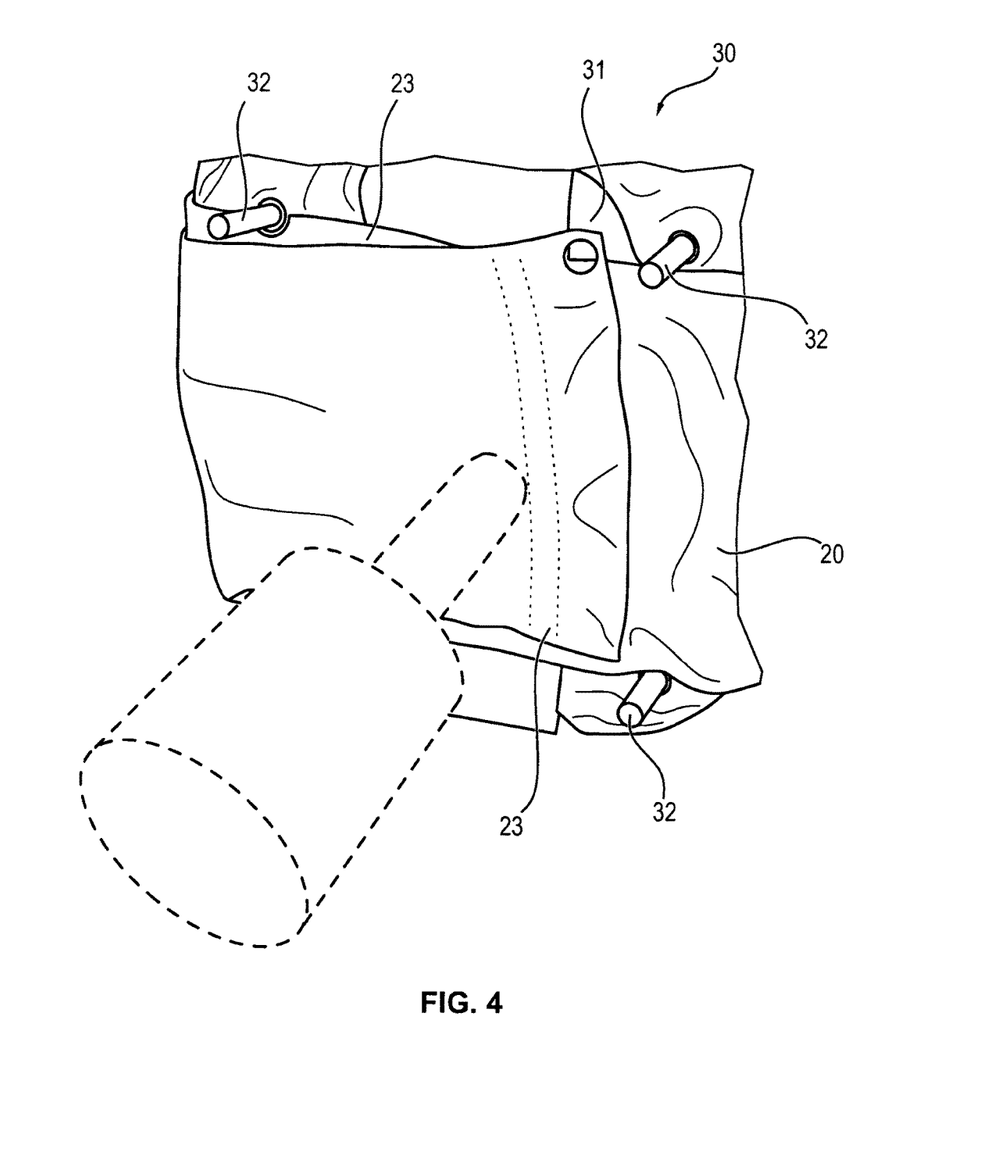
FIG. 4 shows another embodiment regarding an inflatable airbag wrapped according to the invention.

In FIG. 4 another embodiment of an airbag 30 wrapped according to the invention is shown. The wrapping 20 is strip-shaped and thus includes two surface portions 21 starting from the middle of the strip. Each of the outer ends 23 of the surface portions 21 is folded toward the middle of the wrapping 20 so that the airbag 31 is wrapped at least in portions. The outer ends 23 of the two surface portions 21 are welded to each other on the airbag 30. Sufficient tension is created in the wrapping 20 by fastening the surface portions 21 to each other and additionally to the airbag 30. Expansion of the wrapped airbag 31 does not occur.

In FIG. 4 at least the four bolts 32 of the module carrier which is not visible are shown. It is also imaginable that the outer ends 23 of the surface portions 21 are not welded to each other but merely to the airbag 31. For this purpose, the shown wrapping 20 can be designed to be shorter. That is to say, the two surface portions 21 need not form any overlapping area. In this context, it is not necessary to put or thread a surface portion over a bolt 32, either.

LIST OF REFERENCE NUMERALS 10 strip
11 folded airbag
12 module carrier
13 bolt
14 end portico
15 ends of bolts
16 additionally required wrapping surface
20 wrapping
21 surface portion
22 outer edge
23 outer end
24 extension
25 recess
30 wrapped airbag
31 airbag
32 bolt
33 overlapping area
B width of surface portion
L length of surface portion
M middle of wrapping

The invention claimed is:
1. A method of wrapping an inflatable airbag (31) for the protection of a person, comprising the steps of:

folding an airbag (31), fastening the folded airbag (31) to a module carrier, positioning the folded airbag (31) fastened to the module carrier relative to a wrapping (20) including plural surface portions (21) so that the respective outer ends (23) of the surface portions (21) project from the airbag (31), folding each of the outer ends (23) of the surface portions (21) toward the middle (M) of the wrapping (20) so that the folded airbag (31) is wrapped at least in portions, and connecting the outer ends (23) of the surface portions (21) in portions to the airbag (31).

2. A method of wrapping an inflatable airbag (31) for the protection of a person comprising the steps of:

folding an airbag (31), fastening the folded airbag (31) to a module carrier, positioning the folded airbag (31) fastened to the module carrier relative to a wrapping (20) including plural surface portions (21) such that the respective outer ends (23) of the surface portions (21) project from the airbag (31), folding each of the outer ends (23) of the surface portions (21) toward the middle (M) of the wrapping (20) so that the folded airbag (31) is wrapped at least in portions and at least two surface portions (21) are arranged to be overlapping at least in portions in an overlapping area (33), connecting at least two surface portions (21) to each other in portions in the overlapping area (33), and welding at least two surface portions (21) to the airbag (31) in the overlapping area (33).

3. The method according to claim 2, wherein at least one surface portion (21) includes at least one curved and/or circle segment-shaped extension (24) at the outer end (23).

4. The method according to claim 3, wherein at least one surface portion (21) includes two curved and/or circle segment-shaped extensions (24) at the outer end (23).

5. The method according to claim 3, wherein at least one extension (24) projects from the width (B) of a respective surface portion (21) in a non-connected state.

6. The method according to claim 3, wherein each overlapping area (33) is formed by two extensions (24) of adjacent surface portions (21) of the wrapping (20).

7. A method of wrapping an inflatable airbag (31) for the protection of a person comprising the steps of:

folding an airbag (31), fastening the folded airbag (31) to a module carrier, positioning the folded airbag (31) fastened to the module carrier relative to a wrapping (20) including plural surface portions (21) such that the respective outer ends (23) of the surface portions (21) project from the airbag (31), folding each of the outer ends (23) of the surface portions (21) toward the middle (M) of the wrapping (20) so that the folded airbag (31) is wrapped at least in portions and at least two surface portions (21) are arranged to be overlapping at least in portions in an overlapping area (33), and connecting at least two surface portions (21) to each other in portions in the overlapping area (33), wherein at least one surface portions (21) includes a recess (25) at the outer end (23), wherein the folded airbag (31) fastened to a module carrier is positioned relative to the wrapping (20) such that at least one bolt (32) of the module carrier is positioned in a recess (25).

8. The method according to claim 1, wherein the step of connecting includes welding the outer ends of the surface portions in portions to the airbag, the welding being carried out by means of ultrasonic welding and/or hot welding.

9. A wrapped inflatable airbag (30) for the protection of a person, wherein the folded airbag (31) is fastened to a module carrier and is wrapped at least in portions by a wrapping (20), the wrapping being formed of at least four surface portions (21) constituting a cross shape, wherein at least one outer end (23) of a surface portion (21) includes a curved and/or circle segment-shaped extension (24) projecting from the width (B) of the dedicated surface portion (21), wherein at least the outer ends (23) of the surface portions (21) are connected to the airbag (31).

10. A wrapped inflatable airbag (30) for the protection of a person, wherein the folded airbag (31) is fastened to a module carrier and is wrapped at least in portions by a wrapping (20) including at least two surface portions (21), wherein at least the outer ends (23) of the surface portions (21) are folded toward the middle (M) of the wrapping (20) so that the surface portions (21) are arranged to be overlapping at least in portions in an overlapping area (33), the surface portions (21) being connected to each other in the overlapping area (33), and wherein at least two surface portions (21) are connected to the airbag in the overlapping area.

11. A wrapped inflatable airbag (30) for the protection of a person, wherein the folded airbag (31) is fastened to a module carrier and is wrapped at least in portions by a wrapping (20) including at least two surface portions (21), wherein at least the outer ends (23) of the surface portions (21) are folded toward the middle (M) of the wrapping (20) so that the surface portions (21) are arranged to be overlapping at least in portions in an overlapping area (33), the surface portions (21) being connected-to each other in the overlapping area (33), and wherein at least one surface portion (21) includes a recess (25) at the outer end (23), wherein the folded airbag (31) fastened to the module carrier is positioned relative to the wrapping (20) such that at least one bolt (32) of the module carrier is positioned in a recess (25).

12. The wrapped inflatable airbag according to claim 9, wherein at least one surface portion (21) includes two preferably curved and/or circle segment-shaped extensions (24) at the outer end (23).

13. The wrapped inflatable airbag according to claim 9, wherein at least one surface portion (21) includes a recess (25) at the outer end (23).

14. The wrapped inflatable airbag according to claim 12, wherein the recess (25) is formed between two extensions (24).

15. The wrapped inflatable airbag according to claim 9, wherein it is made of PET or PA or HDPE.

16. An airbag module comprising a wrapped airbag (31) according to claim 9.

17. A vehicle occupant restraint system comprising a wrapped airbag (30) according to claim 9.

18. A vehicle occupant restraint system comprising a the wrapped inflatable airbag according to claim 14.

19. A vehicle occupant restraint system comprising an airbag module according to claim 16.

* * * * *

UNITED STATES PATENT AND TRADEMARK OFFICE
CERTIFICATE OF CORRECTION

PATENT NO.         : 10,053,042 B2
APPLICATION NO.    : 15/008541
DATED              : August 21, 2018
INVENTOR(S)        : Fernando Garcia Eireos

Page 1 of 1

It is certified that error appears in the above-identified patent and that said Letters Patent is hereby corrected as shown below:

In the Claims

Column 10, Line 44 Claim 12 reads "preferably curved" should read --curved--

Signed and Sealed this
Twenty-fifth Day of September, 2018

Andrei Iancu
*Director of the United States Patent and Trademark Office*